March 22, 1932.  G. M. ETNYRE  1,850,746
TANK GAUGE
Filed April 13, 1929
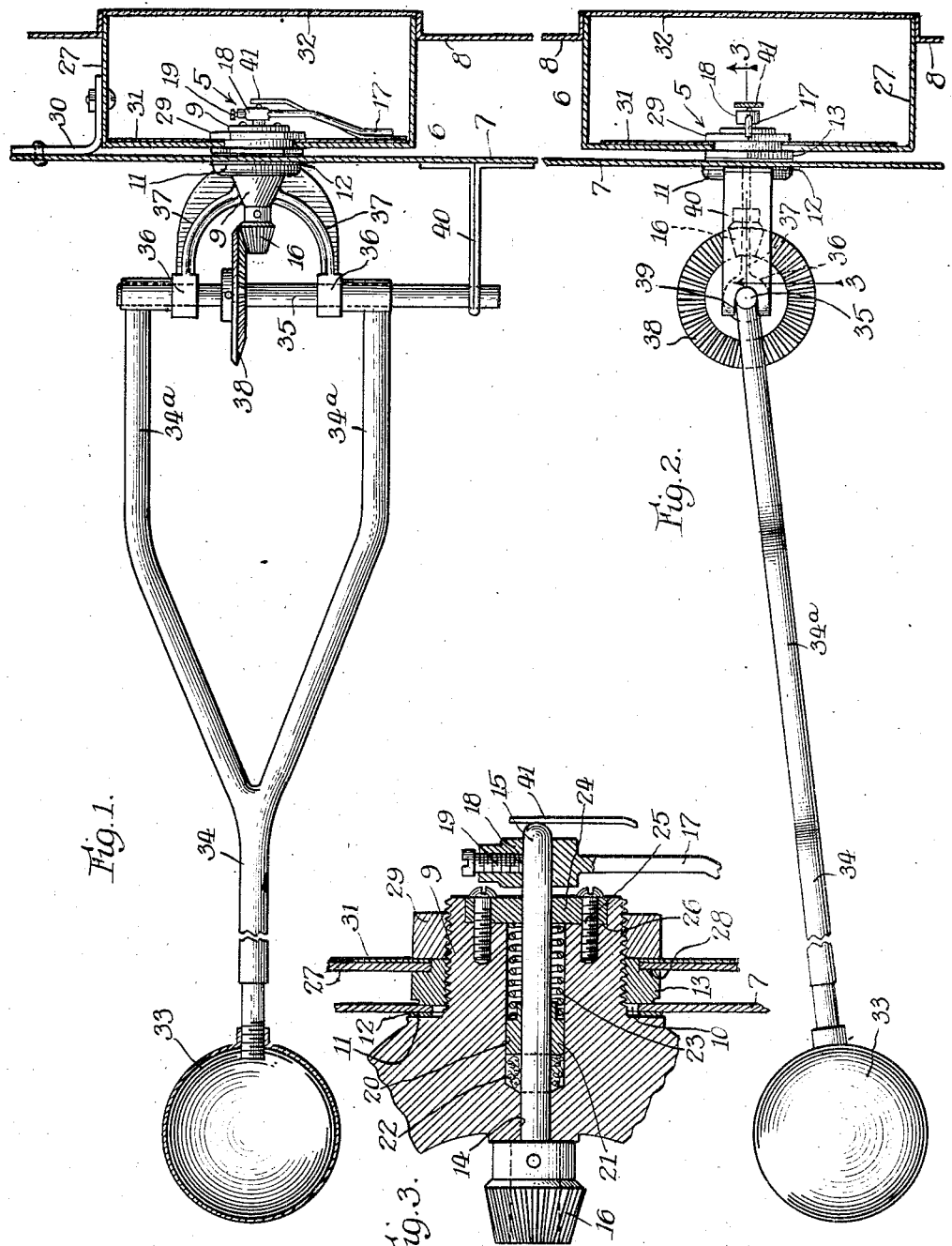
Inventor
George M. Etnyre,
By Crandall Parker Carlson
Attys.

Patented Mar. 22, 1932

1,850,746

UNITED STATES PATENT OFFICE

GEORGE M. ETNYRE, OF OREGON, ILLINOIS, ASSIGNOR TO E. D. ETNYRE & COMPANY, INC., OF OREGON, ILLINOIS, A CORPORATION OF ILLINOIS

TANK GAUGE

Application filed April 13, 1929. Serial No. 354,737.

The invention relates generally to tank gauges for denoting the amount of liquid in a container and more particularly has reference to a gauge especially adapted for use with heavy, viscous liquids such as the various bitumens, road-tars and the like.

It is an object of the invention to provide a new and improved gauge of this character which will operate efficiently and accurately on relatively heavy, highly viscous liquids, and is simple and sturdy in construction.

A further object of the present invention resides in the provision of a gauge for asphalt distributors, in which a minimum number of operative parts come into actual contact with the heavy liquid, and in which said parts are so arranged that during use the parts cannot become stuck or clogged.

Other objects and advantages will become apparent in the following description and from the accompanying drawings, in which:

Figure 1 is a plan view of a preferred form of the invention.

Fig. 2 is a side elevation thereof.

Fig. 3 is an enlarged fragmentary view in central section taken substantially on the lines 3—3 of Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In illustrating the present invention, the device has been shown as embodied in the tank of an asphalt distributor. It has been deemed unnecessary, since distributors of this type are known to those skilled in the art, to fully illustrate the same, it being sufficient to say that the gauge is preferably mounted on the rear wall of the tank with the gauge indicator 5 positioned in the usual heating space or compartment 6 defined by the rear wall 7 of the tank proper and an outer auxiliary wall 8 spaced therefrom.

Generally, the indicator comprises a rotatable indicating shaft having a pointer thereon, which shaft is journalled in a supporting member and extends through the wall of the tank. Within the tank a shaft is also carried by the supporting member for relative rocking movement imparted thereto by a float means arranged to follow the rise and fall of fluid level in the tank, and connecting means interposed between the rock shaft and the indicator shaft produces an indicating movement of the pointer corresponding to the position of the float.

More particularly describing the invention, the indicating mechanism is mounted upon the rear wall 7 of the tank in such manner that it may be readily and easily assembled thereon or removed therefrom. Moreover, the assembly is rigid and is adapted positively to prevent leakage through the mechanism. With particular reference to Fig. 3, the indicating mechanism comprises a substantially cylindrical supporting member 9 which extends through a suitable aperture 10 in the rear wall 7 of the tank. The member 9 has a collar 11 providing a shoulder arranged to abut the inside of the tank wall, and a gasket 12, preferably formed of asbestos or similar heat resisting material, is interposed between the tank wall and the shoulder. The outwardly projecting end of the member 9 is externally screw threaded to receive a nut 13 which may be screwed into abutting engagement with the outer side of the wall 7 rigidly to secure the member thereon.

The supporting member 9 is centrally bored, as at 14, to receive a shaft 15, which, at its inner end, carries a bevel gear 16 rigidly secured thereto. The outer end of the shaft 15 projects beyond the outer end face of the member 9 and carries an elongated arm or pointer 17. The pointer 17 may be affixed thereto in any suitable manner, as by providing an enlarged head 18 centrally apertured to receive the end of the shaft 15 and having therein a set screw 19 adapted to engage the shaft.

The outer portion of the bore 14 is enlarged, as at 20, to form a packing chamber. A preferred type of packing means comprises a sleeve 21 slidable on the shaft 15 and fitting snugly within the enlarged portion 20 of the bore. The sleeve 21 is urged toward packing material 22, in the bottom of the enlarged bore 20, by a coil spring 23 bearing between the outer face of the sleeve 21 and a plate 24 secured, as by screws 25, in a counter-sunk recess 26 formed in the outer end face of the member. The plate 24 preferably fits snugly about the shaft 15 to provide a supporting journal for the free end of the shaft.

Preferably, a closure for the exposed parts of the indicating mechanism is provided in the form of a casing 27 having an open front face. The casing is, in this instance, mounted on the indicating mechanism by forming an outwardly facing rabbeted groove 28 about the periphery of the nut 13 to receive the rear wall of the casing 27 which is apertured for this purpose. A second nut 29, screw threaded on the member 9, secures the casing in place.

In order to prevent rotational movement of the casing relative to the indicating mechanism, an angle bracket 30 (Fig. 1) is secured to the casing and the rear wall 7. At the time the casing is being mounted on the member 9, a disk or graduated scale 31 may be positioned between the nut 29 and the rear wall of the casing 27. If desired, a transparent plate 32, of glass or the like, may be provided to close the open face of the casing 27. As illustrated, the preferred size and disposition of the indicating mechanism and the enclosing casing is such that the assembly is located entirely within the heating compartment 6 with the outer face of the casing lying substantially flush with the auxiliary wall 8. Thus, the mechanism is protected against accidental injury.

The actuating mechanism, by which the pointer 17 is moved to its various indicating positions, comprises a float 33 carried at one end of an arm 34, the other end of which is divided to form the arms 34ᵃ of a yoke. The ends of the arms 34ᵃ are rigidly secured to a shaft 35 extending transversely of the arms, which shaft is in turn journalled, as at 36, in an aligned pair of arms 37 extending from and preferably formed integrally with the supporting member 9. A bevel gear 38, rigid with the shaft 35, engages the bevel gear 16. Thus, the float 33 in following the rise and fall of the liquid in the tank produces a corresponding movement of the shaft 35, bevel gear 38, and bevel gear 16 to move the pointer 17 through its various indicating positions.

In order to prevent relative rotation of the operating mechanism, and to further increase the rigidity of the entire device, the shaft 35 is extended at one end to engage a recess 39 (Fig. 2) formed in the free end of a bracket 40 secured to the inner side of the wall 7. Means are also provided for yieldingly maintaining the bevel gear 16 in mesh with the gear 38. To this end, a leaf spring 41 mounted within the inner side of the casing 27 overlies and engages the outer end of the shaft 15 to exert a pressure urging the shaft inwardly. Consequently, the shaft 15 may yield, to a slight extent, in the event that a piece of foreign matter or other solid material adheres to the teeth of the gear 38.

From the foregoing description, it will be apparent that a simplified device has been provided in which the only moving parts, which might become clogged or otherwise affected, comprises the shafts 15 and 35 and the gears 38 and 16. Inasmuch as material of the character for which this device is adapted is seldom, if ever, handled in a cool condition, it is obvious that the simplicity of the arrangement of parts requires only the slightest amount of heat in order to free the moving parts from the clogging action of any bituminous material which may have adhered to said parts. In addition, the parts cannot become clogged during operation, and the arrangement of parts prevents leakage of liquid through the indicating device.

Moreover, the construction is simple since the provision of the single supporting member 9, for the operating parts, facilitates assembling or disassembling of the device.

I claim as my invention:

1. A liquid level gauge comprising, in combination with a liquid container, an indicator shaft, a bearing for said shaft rigidly mounted in one wall of said container, an indicator carried by the externally projecting end of said shaft, a bevel gear mounted on the internal end of said shaft, float means within said container including a float shaft movable as the liquid level in said container fluctuates, a bevel gear carried by said float shaft for engagement with the bevel gear on said indicator shaft, and resilient means normally urging the bevel gear on said indicator shaft into engagement with the bevel gear on said float.

2. A liquid level gauge comprising, in combination with a liquid container, an indicator shaft, a bearing for said shaft rigidly mounted in one wall of said container, an indicator carried by the externally projecting end of said shaft, a bevel gear mounted on the internal end of said shaft, float means within said container including a float shaft movable as the liquid level in said container fluctuates, a bevel gear carried by said float shaft for engagement with the bevel gear on said indicator shaft, and resilient means engaging the external end of said indicator shaft normally to urge said shaft inwardly to maintain said bevel gears in engagement.

3. A liquid level gauge comprising, in combination with a liquid container, an indicator shaft, bearing means for said indicator shaft rigidly mounted on one wall of said container and extending therethrough, an indicating member carried at the external end of said indicator shaft, a bevel gear rigid with the internal end of said indicator shaft, and float means actuated by the rise and fall of the liquid in said container, said means comprising a float, an elongated member secured to said float having the free end thereof divided to form a pair of spaced arms, a rock shaft extending transversely between said arms and rigidly secured thereto, and a pair of outwardly extending supporting arms formed integrally with said bearing means, aligned bearings in the ends of said supporting arms arranged to receive said rock shaft, and a bevel gear on said rock shaft engaging the bevel gear on said indicator shaft.

4. A liquid level gauge for heavy liquids comprising, in combination with a liquid container, an indicating mechanism including an indicator shaft rotatable in accordance with various liquid levels, a bearing member for said indicator shaft mounted on and extending through one wall of said container, a rock shaft, supporting means for said rock shaft having aligned bearings therein to receive said rock shaft and to position said rock shaft with the axis thereof disposed horizontally and transversely of the axis of said indicator shaft, a float member secured to said rock shaft to effect rocking movement of said shaft as said float follows the fluctuations of the liquid level, means connecting said rock shaft and said indicator shaft to transmit the movements of one to the other, and a bracket mounted on the wall of said container for engaging said rock shaft to prevent rotation of said assembly relative to the wall of said container.

In testimony whereof, I have hereunto affixed my signature.

GEORGE M. ETNYRE.